US012110157B2

(12) United States Patent
Tu

(10) Patent No.: US 12,110,157 B2
(45) Date of Patent: Oct. 8, 2024

(54) OIL BOTTLE

(71) Applicant: Zhejiang JM Industry Co., Ltd., Yuyao (CN)

(72) Inventor: Xufeng Tu, Yuyao (CN)

(73) Assignee: Zhejiang JM Industry Co., Ltd., Yuyao (CN)

( * ) Notice: Subject to any disclaimer, the term of this patent is extended or adjusted under 35 U.S.C. 154(b) by 242 days.

(21) Appl. No.: 18/045,642

(22) Filed: Oct. 11, 2022

(65) Prior Publication Data

US 2023/0278761 A1 Sep. 7, 2023

(30) Foreign Application Priority Data

Mar. 4, 2022 (CN) ........................ 202220469261.8

(51) Int. Cl.

*B65D 47/24* (2006.01)
*B05B 11/10* (2023.01)
*B65D 51/24* (2006.01)

(52) U.S. Cl.

CPC ........ *B65D 47/246* (2013.01); *B05B 11/1042* (2023.01); *B65D 51/242* (2013.01)

(58) Field of Classification Search

CPC . B65D 47/246; B65D 51/242; B05B 11/1042; B05B 15/63; B05B 11/1047; B05B 11/1067; B05B 11/0086; B05B 11/1011

See application file for complete search history.

(56) References Cited

U.S. PATENT DOCUMENTS

| | | | | | |
|---|---|---|---|---|---|
| 4,618,076 | A * | 10/1986 | Silvenis | B05B 11/1057 | 222/541.9 |
| 5,542,581 | A * | 8/1996 | Habora | B05B 11/1011 | 239/436 |
| 5,570,840 | A * | 11/1996 | Gettinger | B05B 7/2416 | 239/361 |
| 6,010,034 | A * | 1/2000 | Walthers | A47G 19/2266 | 239/289 |
| 6,283,335 | B1 * | 9/2001 | Young | B65D 83/22 | 222/189.1 |
| 7,143,958 | B1 * | 12/2006 | Dorney | B05B 11/0086 | 220/705 |
| 8,308,385 | B2 * | 11/2012 | Wu | B05B 11/047 | 401/188 R |
| 9,028,457 | B2 * | 5/2015 | Leach | B05B 11/1084 | 604/289 |
| 9,744,545 | B2 * | 8/2017 | Rhea | B05B 9/0822 | |
| 10,518,282 | B2 * | 12/2019 | Ksiazek | B05B 11/1059 | |
| 10,875,042 | B1 * | 12/2020 | Junkel | B05B 11/0086 | |
| 2008/0006718 | A1 * | 1/2008 | Junkel | B05B 11/0059 | 239/374 |

* cited by examiner

*Primary Examiner* — Ishal Pancholi
(74) *Attorney, Agent, or Firm* — Wang Law Firm, Inc.

(57) ABSTRACT

An oil bottle has a bottle body, an upper cover, a housing, an oil pouring assembly, an oil spray assembly; a button for opening or closing the oil pouring assembly disposed above the upper cover; and a lever for driving the oil spray assembly to spray oil disposed above the upper cover; wherein, the housing has an oil spray port and an oil pouring port at the front side of the housing; the oil pouring assembly communicates with the oil pouring port; the oil spray assembly communicates with the oil spray port through a pipe. The oil bottle has reasonable structure, and is clean and sanitary. The assembly operation is fast and convenient, and the usage of the oil bottle is safe and reliable.

10 Claims, 7 Drawing Sheets

OIL BOTTLE

TECHNICAL FIELD OF THE INVENTION

The present invention relates to the technical field of kitchen utensil, and in particular to an oil spray pot or oil spray bottle.

BACKGROUND OF THE INVENTION

The edible oil bought in the market is generally packaged in big container s. If it is poured directly into the pan, it is not only troublesome, but also difficult to control the usage of oil. In addition, in order to live a healthy life, it is advocated to control the usage of oil. Traditionally, the oil in a big container is poured into an oil pot or an oil bottle. However, when pouring oil from oil pots and oil bottles, the amount of oil cannot be well controlled, and the oil output is uneven, especially in barbecue. Therefore, oil spray bottles emerge. Compared with the traditional usage manner of pouring oil, the oil sprayed by the nozzle of the oil spray bottle can be more evenly distributed. The sprayed oil is foggy or liquid, which is convenient to control the amount of sprayed oil and avoids the waste of oil. However, for the existing oil spray bottles, there will be a phenomenon of oil dripping at the mouth after the oil is sprayed, resulting in waste and polluting the bottle. Moreover, the existing oil spray bottles can only spray oil, and has not the function of oil pouring.

After researching, a Chinese patent CN214190937U (patent No.: CN202120053055.4) was found, which disclosed an oil spray bottle. The oil spray bottle comprises a bottle body, a connecting cylinder and an oil suction pump inserted into the connecting cylinder. The bottom of the oil suction pump is connected to a suction pipe extending to the inside of the bottle body, the top of the oil suction pump has a button, and the button has a nozzle. A top cover for driving the button is movably disposed on the connecting cylinder, the connecting cylinder has a first opening disposed on the position relative to the nozzle, and the top cover has a second opening. When the top cover is rotated, the second opening is superposed or staggered relative to the first opening. The oil spray bottle is clean and convenient to use, but there is also the phenomenon of oil dripping at the mouth, and the oil spray bottle does not have the dual functions of oil spraying and oil pouring.

SUMMARY OF THE INVENTION

It is an object of the present invention to provide an oil bottle designed with simple and reasonable structure, which has the dual functions of oil spraying and oil pouring, and can be used as an oil pot for oil pouring and an oil spray bottle for oil spraying.

For achieving the object, the oil bottle comprises a bottle body with a top and an inner chamber; an upper cover connected to the top of the bottle body; a housing with a front side and a rear side connected to the upper cover; an oil pouring assembly located on the top of the upper cover; an oil spray assembly located adjacent to the oil pouring assembly; a button for opening or closing the oil pouring assembly disposed above the upper cover; and a lever for driving the oil spray assembly to spray oil disposed above the upper cover; wherein, the housing has an oil spray port and an oil pouring port at the front side of the housing; the oil pouring assembly communicates with the oil pouring port; the oil spray assembly communicates with the oil spray port through a pipe.

Preferably, the top of the bottle body has an externally threaded neck, the upper cover has an annular sidewall and a top surface, the annular sidewall of the upper cover is threaded onto the externally threaded neck, the housing is connected to the upper cover; the oil pouring port is located below the oil spray port, and the opening of the oil pouring port inclined upward; the upper cover has a cylindrical mounting seat with a bottom opening for the oil pouring assembly located on the upper cover; the upper cover has an inclined oil outlet on the top surface of the upper cover communicating with the oil pouring port; the oil pouring assembly comprises a tube, a switch with a bottom surface, a rotating shaft, a switch bracket, a movable valve connecting rod with a top and a bottom disposed inside the tube, and a valve located below the upper cover and facing the bottom opening of the mounting seat; the tube extends inside the mounting seat; the switch bracket is disposed inside the mounting seat corresponding to the oil outlet; the bottom of the valve connecting rod passes through the switch bracket and is connected to the valve, and the rotating shaft is connected to the top of the valve connecting rod, the switch is connected to the rotating shaft and the button is connected to the switch; the switch has an annular gear at the bottom surface of the switch, the rotating shaft has corresponding multiple teeth for engaging the annular gear; the tube surrounds the top of the valve connecting rod, the rotating shaft and the switch, the bottom of the tube resists against the switch bracket, a spring is disposed out of the valve connecting rod and inside the tube, so as to make the valve connecting rod to keep moving up, to pull the valve upward to resist against the bottom of the upper cover, so as to close and the bottom opening of the mounting seat and the oil outlet.

Preferably, the switch bracket is disposed inside the mounting seat and out of the valve connecting rod; the bottom of the sleeve has a flange protruding outward, correspondingly, the inner wall of mounting seat has a step, the flange of the sleeve is resisted against the step to make the sleeve be positioned with the mounting seat; an air return passage are defined between the sleeve and the switch, the rotating shaft, the valve connecting rod, which is communicated with the chamber of the bottle body.

Preferably, the top of the bottle body has an externally threaded neck, the upper cover has an annular sidewall and a top surface, the annular sidewall of the upper cover is threaded connected on the externally threaded neck, the housing is connected to the upper cover; the oil pouring port is below the oil spray port, and the opening of the oil pouring port inclined upward; the upper cover has a cylindrical mounting seat with a bottom opening for the oil pouring assembly located on the upper cover; the upper cover has an inclined oil outlet on the top surface of the upper cover communicating with the oil pouring port; the oil pouring assembly comprises a tube with a lower portion, a switch with a bottom surface, a rotating shaft, a spring seat, a movable valve connecting rod with a top and a bottom disposed inside the tube, and a valve located below the upper cover and facing the bottom opening of the mounting seat; the lower portion of the tube is disposed inside the mounting seat; the spring seat is disposed inside the mounting seat corresponding to the oil outlet; the bottom of the valve connecting rod passes through the spring seat and is connected to the valve, and the rotating shaft is connected to the top of the valve connecting rod, the switch is connected to the rotating shaft and the button is connected to the switch; the switch has an annular gear at the bottom surface of the switch, the rotating shaft has corresponding multiple teeth for engaging the annular gear; the tube surrounds the top of the valve connecting rod, the rotating shaft and the switch, a spring is disposed out of the valve connecting rod and inside the tube, so as to make the valve connecting rod to keep moving up, to pull the valve upward to resist against the bottom of the upper cover, so as to close the bottom opening of the mounting seat and the oil outlet; the tube and the bottom of the spring is resisted against the spring seat.

Preferably, the upper cover has an oil pouring air return hole located outside the mounting seat; correspondingly, a silica gel plug is disposed at the bottom of the oil pouring air return hole, the silica gel plug and the valve are connected with each other.

Preferably, an oil spray seat with a front end is mounted in the oil spray port, a spray nozzle is mounted at the front end of the oil spray seat; the oil spray assembly comprises an oil spray cylinder with a bottom, piston with a top and a bottom, an oil spray pipe, and a suction pipe with a top and a bottom; the oil spray cylinder is barrel-shaped and has an inner wall, the bottom of the oil spray cylinder has a first through hole and a second through hole; the oil spray pipe connected to the oil spray seat is disposed at the bottom of the first through hole, a pressure valve is mounted at the top of the first through hole; the top of the suction pipe is inserted into the bottom of the second through hole, the bottom of the suction pipe extends toward the bottom of the bottle body, and a one-way valve is mounted inside the second through hole and above the top of the suction pipe; the piston capable of moving up and down is mounted at the top of the oil spray cylinder, an oil storage chamber is defined in the oil spray cylinder between the bottom of the piston and the pressure valve, the lever is mounted on the upper cover to be resisted against the top of the piston.

Preferably, the oil spray cylinder and the upper cover are integrated into one piece; the piston is a diameter-reduced upper portion, the bottom of the piston is resisted against the inner wall of the oil spray cylinder to be movably sealed; an inner cover is disposed at the top of the oil spray cylinder, the piston has a step at the peripheral surface of the piston for the inner cover to resist against and be limited, and the top of the piston extends out of the upper cover to be resisted against the lever through a connecting cover.

Preferably, the housing has an opening for mounting the lever at the rear side of the top of the housing, a covering plate is disposed at the opening below the lever to cover the internal components and realize appearance beatification; the upper cover has two connecting lugs at the middle portion of the upper cover, a shaft pin is correspondingly mounted at the front end of the lever, and the lever is rotatably connected to the connecting lugs through the shaft pin; the connecting cover is connect to the top of the piston, the top of the connecting cover has an arc-shaped protrusion, the bottom of the lever has a corresponding arc-shaped concave surface, and the piston is resisted against the lever through the arc-shaped protrusion resisting against the arc-shaped concave surface; a reset spring is sleeved outside the piston, so as to make the piston keep moving upward.

Preferably, the housing surrounds the upper cover and is connected to the upper cover; a handle is connect to the rear end of the housing, a top cover covers on the top of the housing, and the top cover has a round hole for receiving the button.

Preferably, an oil pouring nozzle is disposed inside the oil pouring port of the housing and the oil outlet of the upper cover to communicate the oil pouring port and the oil outlet.

Compared with the prior art, the present invention has the following advantages: the oil spray port and the oil pouring port are disposed at the front side of the housing, the oil pouring assembly and the oil spray assembly are disposed on the upper cover and inside the housing, the user can pour oil through pressing the button, and can spray oil spray through pressing the lever; the oil spray seat is mounted inside the oil spray port, the oil spray cylinder is disposed on the upper cover, and the piston and the pressure valve are disposed in the oil spray cylinder. Therefore, the valve can be opened to spray oil only when the pressure in the oil storage chamber reaches a certain value, and the valve will be closed quickly by the spring when the pressure is low, so that the phenomenon of oil dripping at the mouth after the oil is sprayed will be effectively avoided. The oil bottle of the present invention has reasonable structure, can realize dual functions of oil pouring and oil spraying, and also solves the problem of oil dripping at the oil spray port after oil spraying, which not only reduces waste, but also is clean and sanitary. At the same time, the assembly operation of the oil bottle is fast and convenient, which can effectively control the usage of oil, and the usage of the oil bottle is safe and reliable.

DETAILED DESCRIPTION OF THE INVENTION

Figure 1:
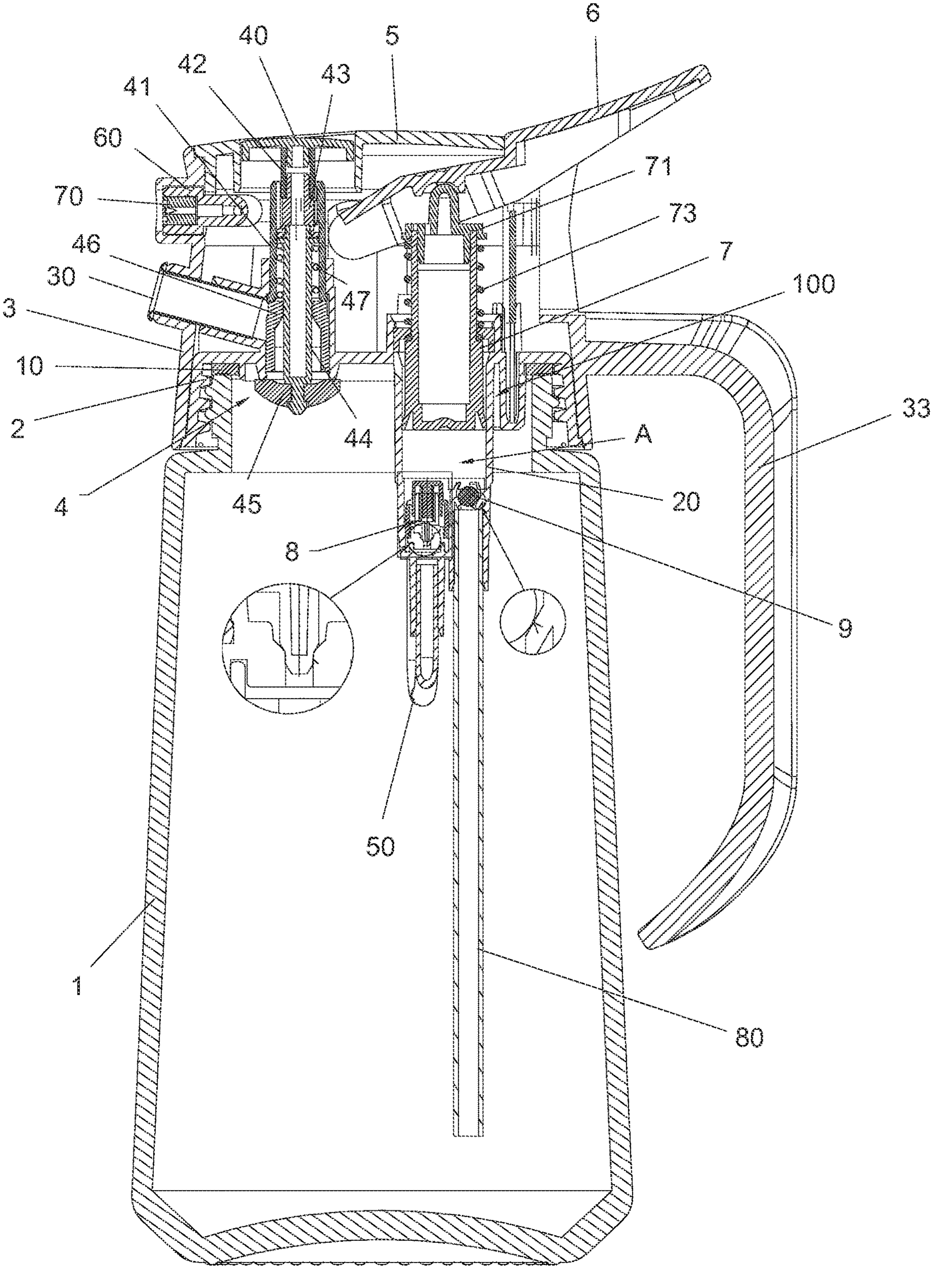
FIG. 1 is a sectional view of an oil bottle according to Embodiment 1 of the present invention when the pressure valve is closed and the ball valve is closed.

The present invention will be described in further detail with reference to the following embodiments.

Embodiment 1

FIGS. 1 to 6 show a first embodiment of the oil bottle of the present invention. The oil bottle comprises a bottle body 1 with a top and an inner chamber; an upper cover 2 connected to the top of the bottle body 1; a housing 3 with a front side and a rear side connected to the upper cover 2; an oil pouring assembly 4 located on the top of the upper cover 2; an oil spray assembly 100 located adjacent to the oil pouring assembly 4; a button 40 for opening or closing the oil pouring assembly 4 disposed above the housing 3; and a lever 6 for driving the oil spray assembly 100 to spray oil disposed above the housing 3. Wherein, the housing 3 has an oil spray port 31 and an oil pouring port 32 at the front side of the housing 3, the oil pouring assembly 4 communicates with the oil pouring port 32, the oil spray assembly 100 communicates with the oil spray port 31 through a pipe.

Figure 4:
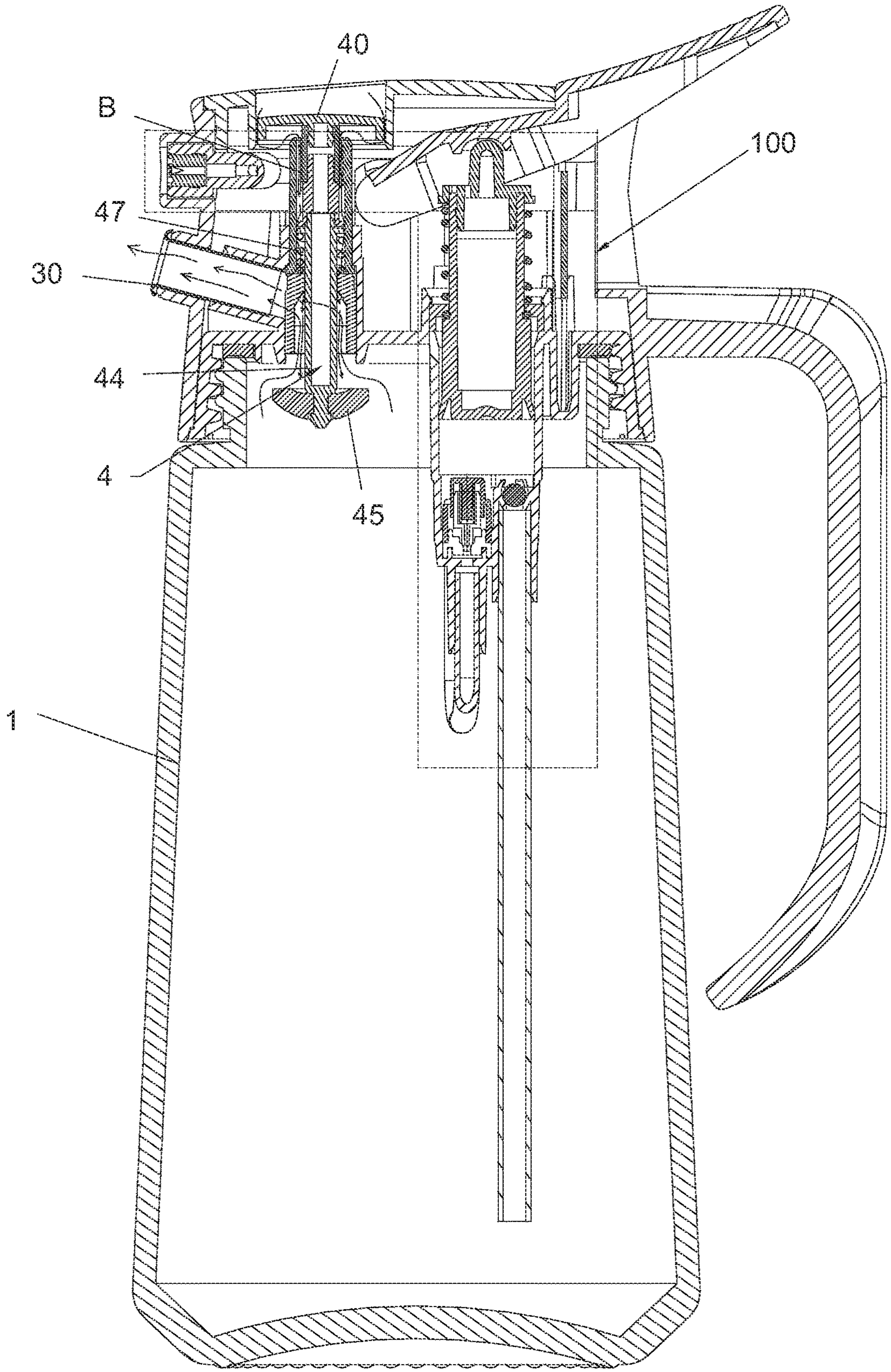
FIG. 4 is a sectional view of the oil bottle according to Embodiment 1 of the present invention when used in oil pouring.
Figure 5:
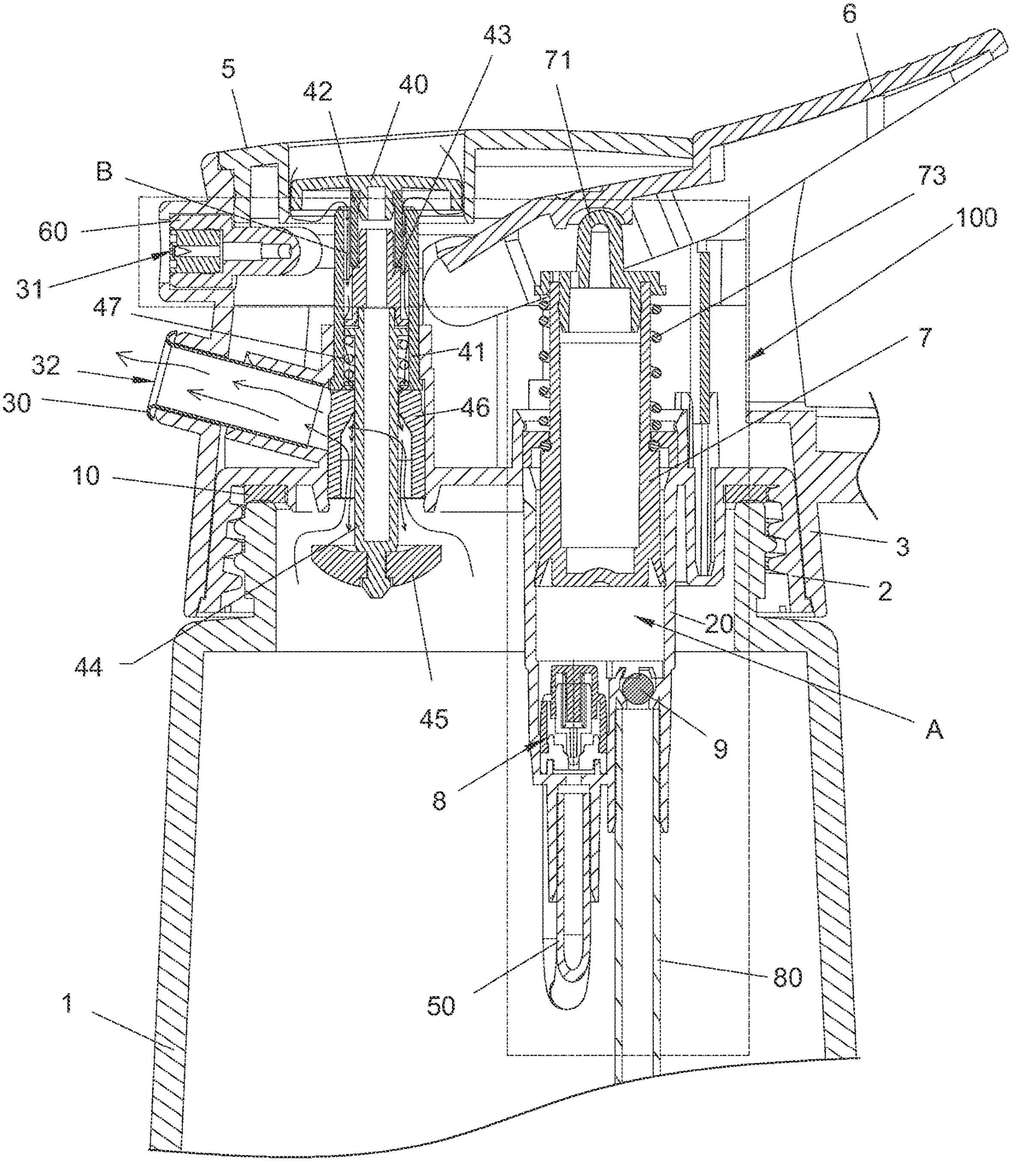
FIG. 5 is an enlarged view of portion of FIG. 4.
Figure 6:
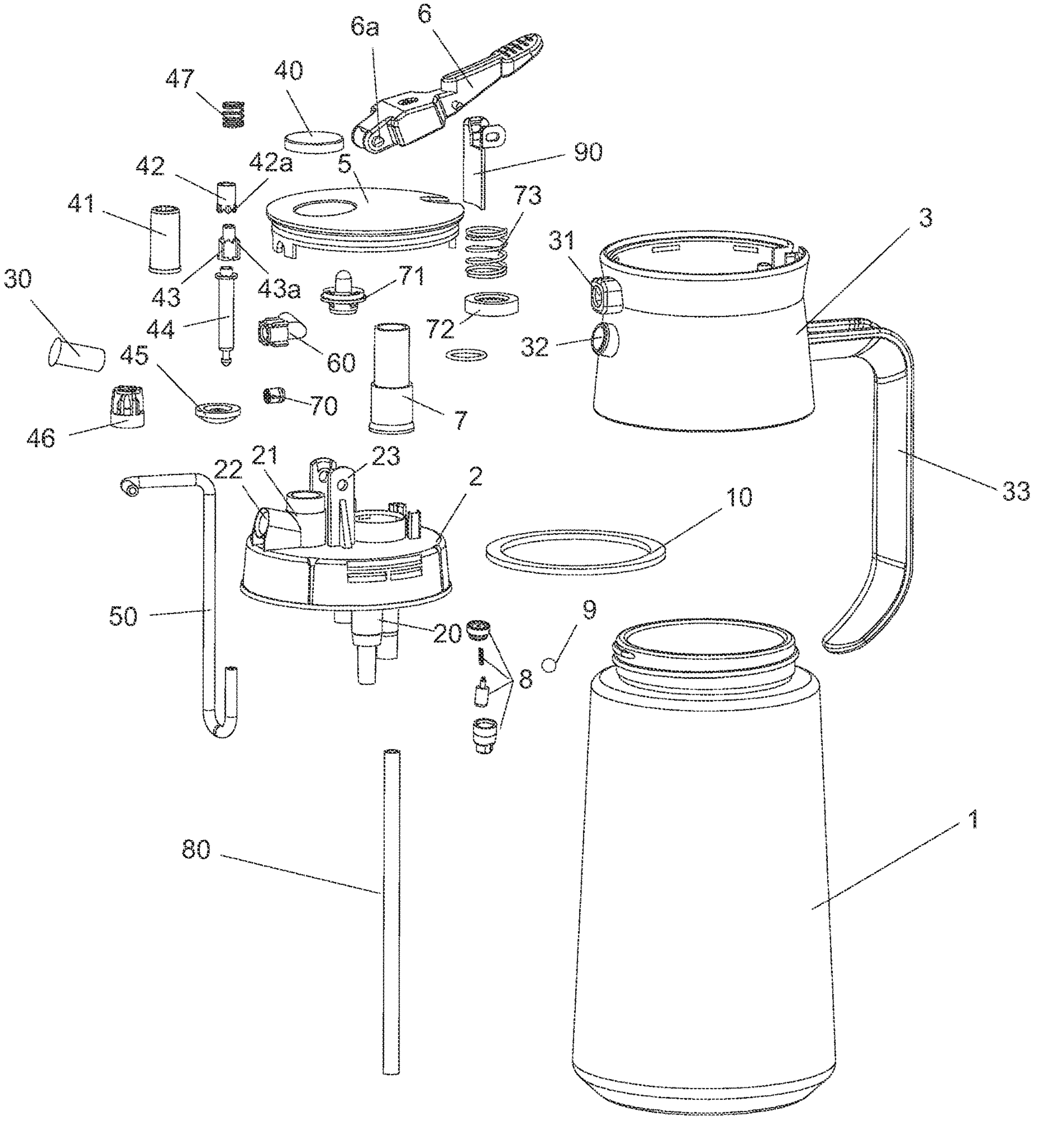
FIG. 6 is an exploded view of the oil bottle according to Embodiment 1 of the present invention.

Specifically, the top of the bottle body 1 has an externally threaded neck, the upper cover 2 has an annular sidewall and a top surface, the annular sidewall of the upper cover 2 is threaded onto the externally threaded neck, and a sealing ring 10 is disposed between the upper cover 2 and the externally threaded neck of the bottle body 1. The housing 3 is fitted with the upper cover 2 and covered outside the upper cover 2, and the oil pouring port 32 is located below the oil spray port 31, and the opening of the oil pouring port 32 inclined upward. The upper cover 2 has a cylindrical mounting seat 21 with a bottom opening for the oil pouring assembly 4 located on the upper cover 2, and an inclined oil outlet 22 corresponding to the oil pouring port 32 is convexly formed on one side of the mounting seat 21 close to the oil pouring port 32, an oil pouring nozzle 30 is disposed inside the oil pouring port 32 and the oil outlet 22 of the upper cover 2 to communicate the oil pouring port 32 and the oil outlet 22. The oil pouring assembly 4 comprises a tube 41, a switch 42 with a bottom surface, a rotating shaft 43, a switch bracket 46, a movable valve connecting rod 44 with a top and a bottom disposed inside the tube 41, and a valve 45 located below the upper cover 2 and facing the bottom opening of the mounting seat 21; the tube 41 extends inside the mounting seat 21; the switch bracket 46 is disposed inside the mounting seat 21 corresponding to the oil outlet 22; the bottom of the valve connecting rod 44 passes through the switch bracket 46 and is connected to the valve 45, and the rotating shaft 43 is connected to the top of the valve connecting rod 44, the switch 42 is connected to the rotating shaft 43 and the button 40 is connected to the switch 42; the switch 42 has an annular gear **42*a* at the bottom surface of the switch 42, the rotating shaft 43 has corresponding multiple teeth 43*a* for engaging the annular gear 42*a*; the tube 41 surrounds the top of the valve connecting rod 44, the rotating shaft 43 and the switch 42, the bottom of the tube 41 can resist against the switch bracket 46, and a spring 47 is disposed out of the valve connecting rod 44 and inside the tube 41, so as to make the valve connecting rod 44 to keep moving up, to pull the valve 45 upward to resist against the bottom of the upper cover 2, so as to close and the bottom opening of the mounting seat 21 and the oil outlet 22. The switch bracket 46 is disposed inside the mounting seat 21 and out of the valve connecting rod 44; the bottom of the sleeve 41 has a flange protruding outward, correspondingly, the inner wall of mounting seat 21 has a step, the flange of the sleeve 41 is resisted against the step to make the sleeve 41 be positioned with the mounting seat 21; an air return passage B are defined between the sleeve 41 and the rotating shaft 43, the switch 42, the valve connecting rod 44, which is communicated with the chamber of the bottle body 1, and the arrows between the sleeve 41 and the rotating shaft 43 in FIGS. 4 and 5 show the air return direction. The switching principle of the oil pouring assembly 4 of this embodiment is similar to that of the retractable refill switch mechanism of the ball pen, by pressing the button 40, the valve 45 is opened, so that the oil can be poured out from the oil outlet 22; and, by pressing the button 40 again, the valve 45** is closed.

An oil spray seat 60 with a front end is mounted in the oil spray port 31, a spray nozzle 70 is mounted at the front end of the oil spray seat 60; the oil spray assembly 100 comprises an oil spray cylinder 20 with a bottom, piston 7 with a top and a bottom, an oil spray pipe 50, and a suction pipe 80 with a top and a bottom; the oil spray cylinder 20 is barrel-shaped and has an inner wall, the bottom of the oil spray cylinder 20 has a first through hole and a second through hole; the oil spray pipe 50 serving as the pipe to be connected to the oil spray seat 60 (the oil spray port 31) and the oil storage chamber A is disposed at the bottom of the first through hole, a pressure valve 8 is mounted at the top of the first through hole, the structure of the pressure valve 8 is similar to the conventional pressure valve and will not be described here. The top of the suction pipe 80 is inserted into the bottom of the second through hole, the bottom of the suction pipe 80 extends toward the bottom of the bottle body 1, and a ball valve 9 as a one-way valve is mounted inside the second through hole and above the top of the suction pipe 80; the piston 7 capable of moving up and down is mounted at the top of the oil spray cylinder 20, an oil storage chamber A is defined in the oil spray cylinder 20 between the bottom of the piston 7 and the pressure valve 8, the lever 6 is mounted on the upper cover 2 to be rotatably connected to the top of the piston 7. The oil spray cylinder 20 and the upper cover 2 are integrated into one piece; the piston 7 is a diameter-reduced upper portion, the bottom of the piston 7 is resisted against the inner wall of the oil spray cylinder 20 to be movably sealed; an inner cover 72 is disposed at the top of the oil spray cylinder 20, the piston 7 has a step at the peripheral surface of the piston 7 for the inner cover 72 to resist against and be limited, and the top of the piston 7 extends out of the upper cover 2 to be resisted against the lever 6 through a connecting cover 71. The housing 3 has an opening for mounting the lever 6 at the rear side of the top of the housing 3, a covering plate 90 is disposed at the opening below the lever 6 to cover the internal components and realize appearance beatification; the upper cover 2 has two connecting lugs 23 at the middle portion of the upper cover 2, a shaft pin **6*a* is correspondingly mounted at the front end of the lever 6, and the lever 6 is rotatably connected to the connecting lugs 23 through the shaft pin 6*a*; the connecting cover 71 is connect to the top of the piston 7, the top of the connecting cover 71 has an arc-shaped protrusion 71*a*, the bottom of the lever 6 has a corresponding arc-shaped concave surface 6*b*, and the piston 7 is resisted against the lever 6 through the arc-shaped protrusion 71*a* resisting against the arc-shaped concave surface 6*b*; a reset spring 73 is sleeved outside the piston 7, so as to make the piston 7** keep moving upward.

A handle 33 is connect to the rear end of the housing 3, so that it is convenient to carry, and a top cover 5 covers on the top of the housing 3, and the top cover 5 has a round hole for receiving the button 40.

The bottle body 1 in this embodiment is a wide-mouth bottle made of lead-free glass, it is environment-friendly and sanitary, since the bottle mouth is large, it is convenient to pour oil, it is convenient to clean, and it can be used repeatedly.

The operation principle is described below:

In the process of pouring oil, as shown in FIGS. 4 and 5, the button 40 is pressed to open the valve 45, so that the oil can be poured out. When the button 40 is pressed again, the valve 45 is closed.

Figure 2:
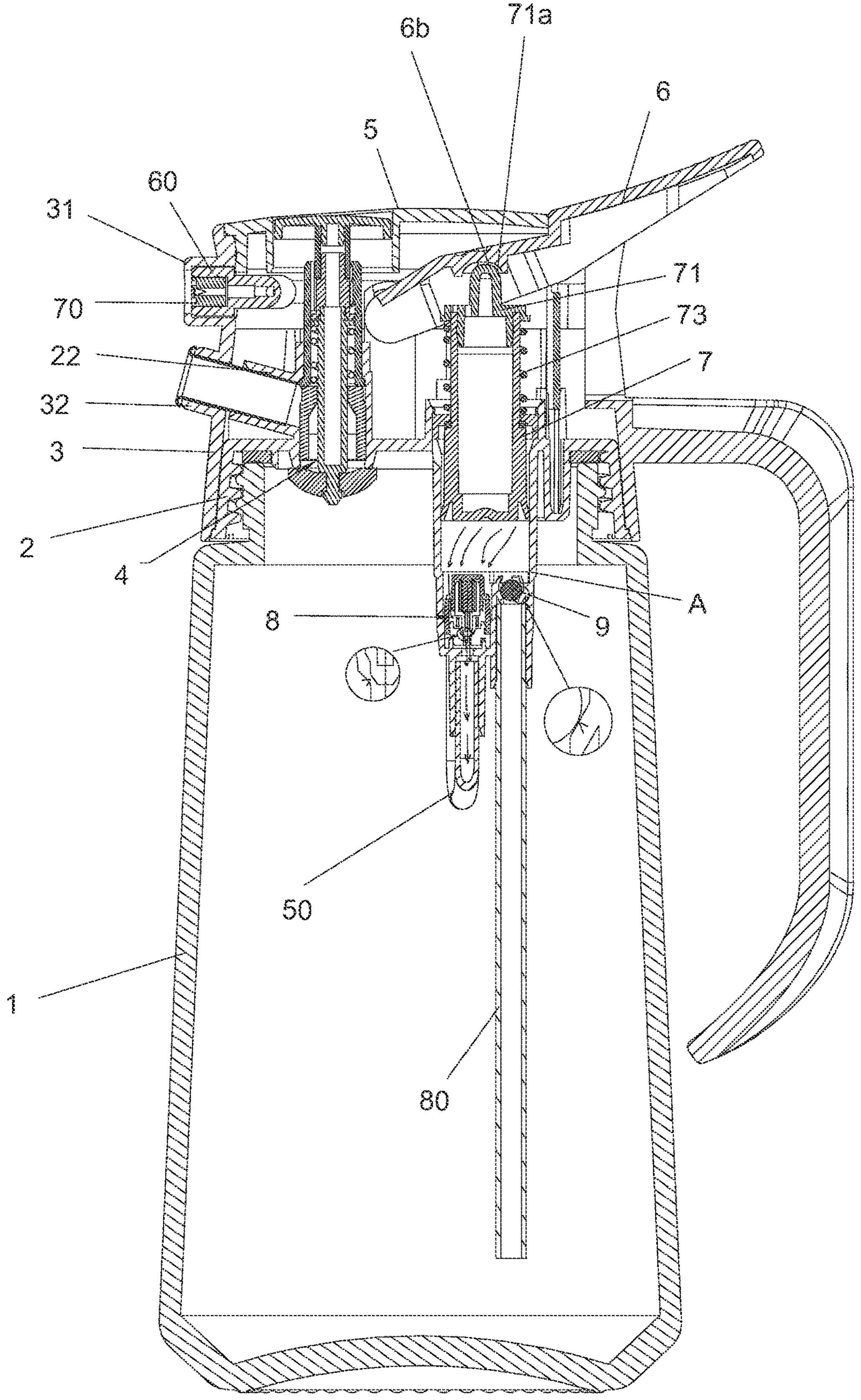
FIG. 2 is a sectional view of the oil bottle according to Embodiment 1 of the present invention when the pressure valve is opened and the ball valve is closed.
Figure 3:
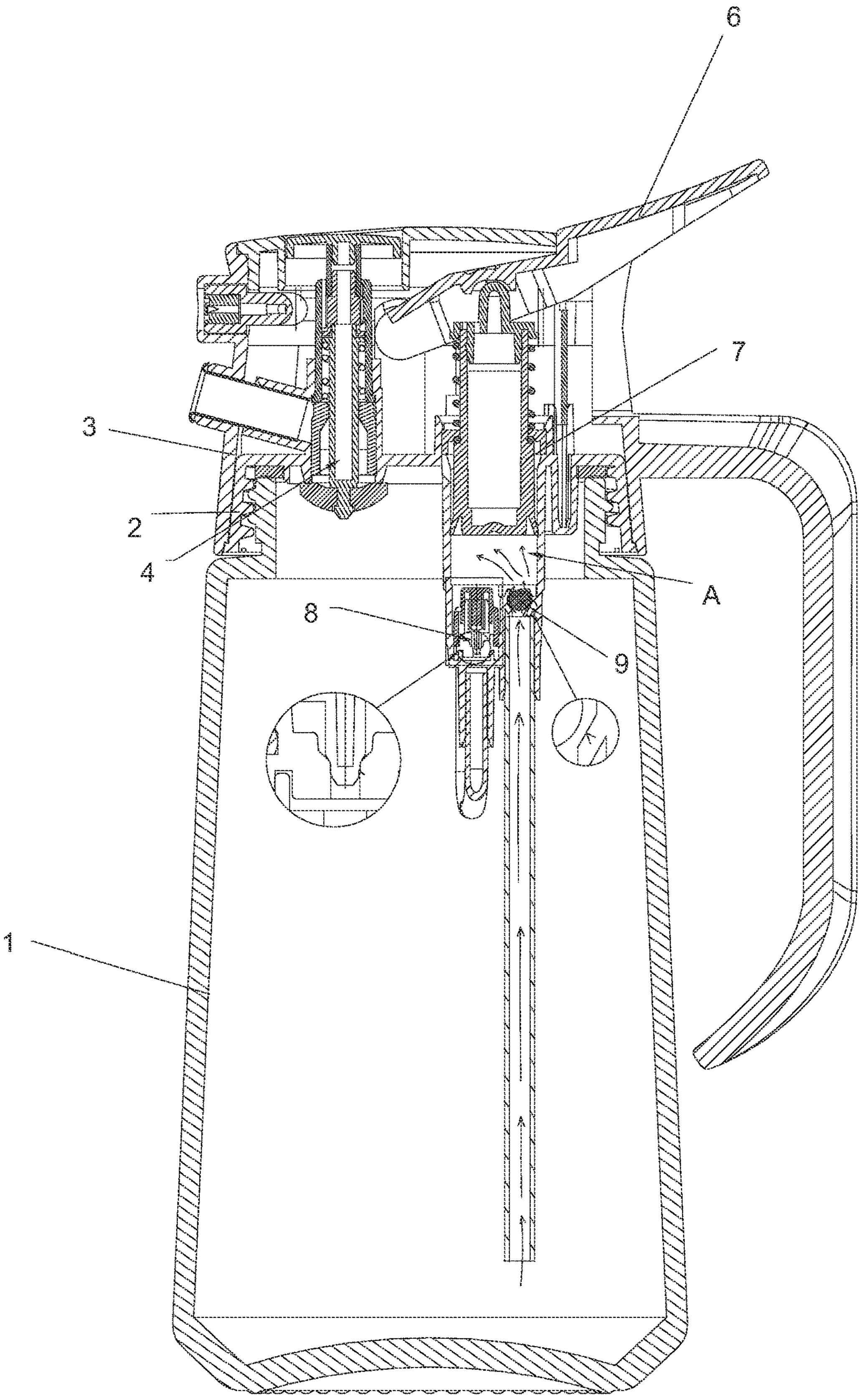
FIG. 3 is a sectional view of the oil bottle according to Embodiment 1 of the present invention when the pressure valve is closed and the ball valve is opened.

In the process of spraying oil, the lever 6 is pressed down, the piston 7 moves downwards, in the initial stage, the pressure valve 8 and the ball valve 9 are both closed, as shown in FIG. 1, the piston 7 compresses the oil storage chamber A, when the pressure of the oil storage chamber A reaches a certain pressure value, the pressure valve 8 is opened, and the oil in the oil storage chamber A is ejected from the oil spray seat 60 along the oil spray pipe 50, as shown in FIG. 2; when the pressure of the oil storage chamber A is reduced to a certain value after most of oil is ejected out, the pressure valve 8 is instantly closed to stop oil spraying, thereby avoiding dripping and leakage and also avoiding the phenomenon of liquid seepage at the oil spray port 31; after the lever 6 is loosened, the piston 7 moves upwards, as shown in FIG. 3, the ball valve 9 is opened instantly, the oil in the bottle body 1 is sucked into the oil storage chamber A through the suction pipe 80, and a whole liquid discharging and suction process is completed.

Embodiment 2

Figure 7:
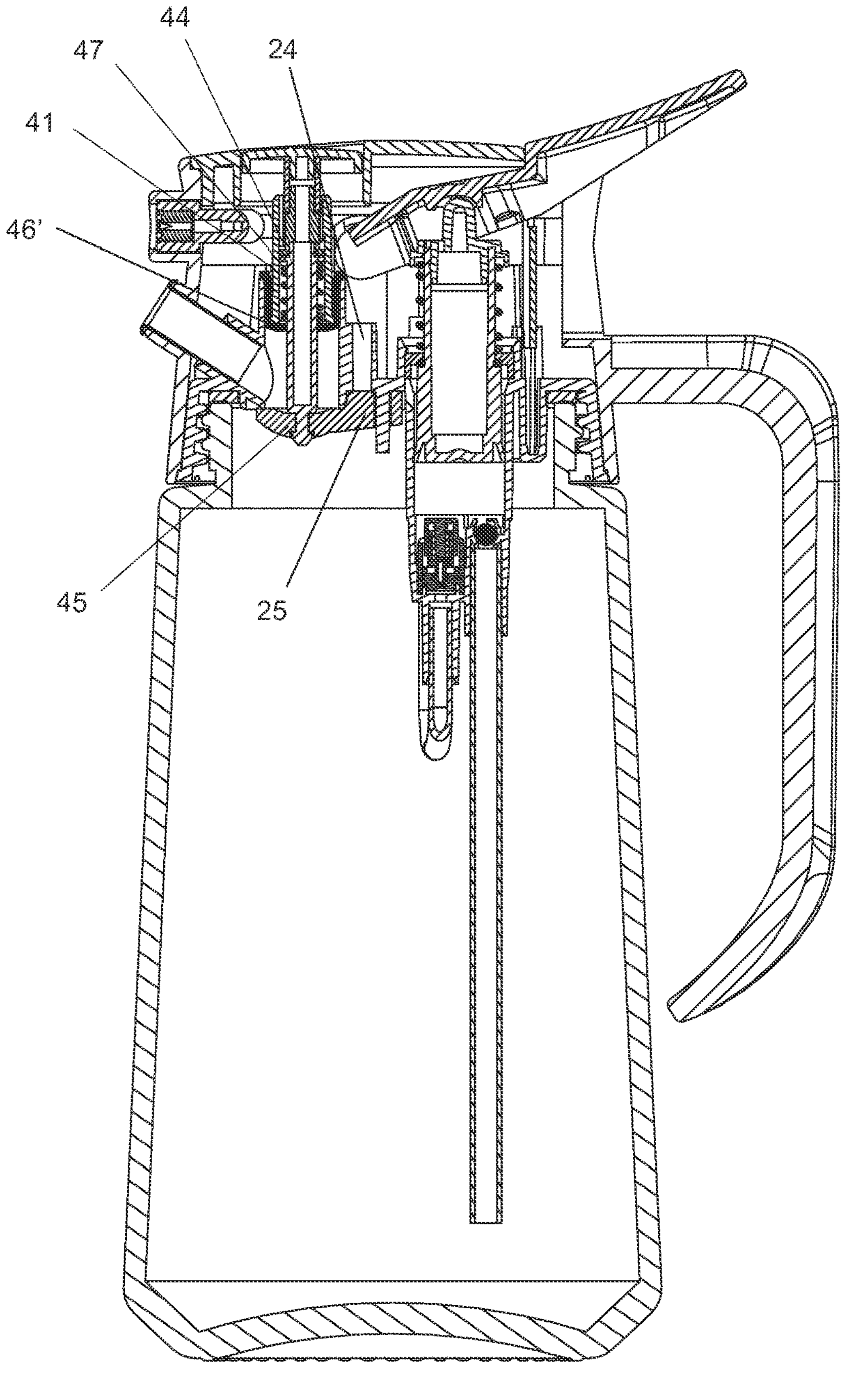
FIG. 7 is a sectional view of the oil bottle according to Embodiment 2 of the present invention when the pressure valve is closed and the ball valve is closed.

FIG. 7 shows a second embodiment of the oil bottle. The difference of the second embodiment with the above first embodiment is that, in order to increase the return air volume, the upper cover 2 has an oil pouring air return hole 24 located outside the mounting seat 21; correspondingly, a silica gel plug 25 is disposed at the bottom of the oil pouring air return hole 24. Generally, the valve 45 is also made of silica gel. Therefore, the silica gel plug 25 and the valve 45 are connected with each other forming one component. At the same time, the original switch bracket 46 is eliminated, and a spring seat 46' is disposed inside the mounting seat 21, and is resisted against the tube 41 and the bottom of the spring 47, The spring seat 46' has a through hole at the center to allow the valve connecting rod 44 to pass through. The other detail structure is the same as Embodiment 1 and will not be repeated here. Since the switch bracket 46 in Embodiment 1 is eliminated and the oil pouring air return hole 24 is additionally formed, the oil pouring is smoother.

The protection scope of the present invention is not limited to each embodiments described in this description. Any changes and replacements made on the basis of the scope of the present invention patent and of the description shall be included in the scope of the present invention patent.

The invention claimed is:

1. An oil bottle, comprising:

a bottle body with a top and an inner chamber;

an upper cover connected to the top of the bottle body;

a housing with a front side and a rear side connected to the upper cover;

an oil pouring assembly located on the top of the upper cover;

an oil spray assembly located adjacent to the oil pouring assembly;

a button for opening or closing the oil pouring assembly disposed above the upper cover;

and a lever for driving the oil spray assembly to spray oil disposed above the upper cover;

wherein, the housing has an oil spray port and an oil pouring port at the front side of the housing;

the oil pouring assembly communicates with the oil pouring port;

the oil spray assembly communicates with the oil spray port through a pipe.

2. The oil bottle of claim 1, wherein the top of the bottle body has an externally threaded neck, the upper cover has an annular sidewall and a top surface, the annular sidewall of the upper cover is threaded onto the externally threaded neck, the housing is connected to the upper cover;

the oil pouring port is located below the oil spray port, and the opening of the oil pouring port inclined upward;

the upper cover has a cylindrical mounting seat with a bottom opening for the oil pouring assembly located on the upper cover;

the upper cover has an inclined oil outlet on the top surface of the upper cover communicating with the oil pouring port;

the oil pouring assembly comprises a tube, a switch with a bottom surface, a rotating shaft, a switch bracket, a movable valve connecting rod with a top and a bottom disposed inside the tube, and a valve located below the upper cover and facing the bottom opening of the mounting seat;

the tube extends inside the mounting seat;

the switch bracket is disposed inside the mounting seat corresponding to the oil outlet;

the bottom of the valve connecting rod passes through the switch bracket and is connected to the valve, and the rotating shaft is connected to the top of the valve connecting rod, the switch is connected to the rotating shaft and the button is connected to the switch;

the switch has an annular gear at the bottom surface of the switch, the rotating shaft has corresponding multiple teeth for engaging the annular gear;

the tube surrounds the top of the valve connecting rod, the rotating shaft and the switch, a spring is disposed out of the valve connecting rod and inside the tube, so as to make the valve connecting rod to keep moving up, to pull the valve upward to resist against the bottom of the upper cover, so as to close and the bottom opening of the mounting seat and the oil outlet.

3. The oil bottle of claim 2, wherein the switch bracket is disposed inside the mounting seat and out of the valve connecting rod;

the bottom of the sleeve has a flange protruding outward, correspondingly, the inner wall of mounting seat has a step, the flange of the sleeve is resisted against the step to make the sleeve be positioned with the mounting seat;

an air return passage are defined between the sleeve and the switch, the rotating shaft, the valve connecting rod, which is communicated with the chamber of the bottle body.

4. The oil bottle of claim 1, wherein the top of the bottle body has an externally threaded neck, the upper cover has an annular sidewall and a top surface, the annular sidewall of the upper cover is threaded connected on the externally threaded neck, the housing is connected to the upper cover;

the oil pouring port is below the oil spray port, and the opening of the oil pouring port inclined upward;

the upper cover has a cylindrical mounting seat with a bottom opening for the oil pouring assembly located on the upper cover;

the upper cover has an inclined oil outlet on the top surface of the upper cover communicating with the oil pouring port;

the oil pouring assembly comprises a tube with a lower portion, a switch with a bottom surface, a rotating shaft, a spring seat, a movable valve connecting rod with a top and a bottom disposed inside the tube, and a valve located below the upper cover and facing the bottom opening of the mounting seat;

the lower portion of the tube is disposed inside the mounting seat;

the spring seat is disposed inside the mounting seat corresponding to the oil outlet;

the bottom of the valve connecting rod passes through the spring seat and is connected to the valve, and the rotating shaft is connected to the top of the valve connecting rod, the switch is connected to the rotating shaft and the button is connected to the switch;

the switch has an annular gear at the bottom surface of the switch, the rotating shaft has corresponding multiple teeth for engaging the annular gear;

the tube surrounds the top of the valve connecting rod, the rotating shaft and the switch, a spring is disposed out of the valve connecting rod and inside the tube, so as to make the valve connecting rod to keep moving up, to pull the valve upward to resist against the bottom of the upper cover, so as to close the bottom opening of the mounting seat and the oil outlet;

the tube and the bottom of the spring is resisted against the spring seat.

5. The oil bottle of claim 4, wherein the upper cover has an oil pouring air return hole located outside the mounting seat;

correspondingly, a silica gel plug is disposed at the bottom of the oil pouring air return hole, the silica gel plug and the valve are connected with each other.

6. The oil bottle of claim 1, wherein an oil spray seat with a front end is mounted in the oil spray port, a spray nozzle is mounted at the front end of the oil spray seat;

the oil spray assembly comprises an oil spray cylinder with a bottom, piston with a top and a bottom, an oil spray pipe, and a suction pipe with a top and a bottom;

the oil spray cylinder is barrel-shaped and has an inner wall, the bottom of the oil spray cylinder has a first through hole and a second through hole;

the oil spray pipe connected to the oil spray seat is disposed at the bottom of the first through hole, a pressure valve is mounted at the top of the first through hole;

the top of the suction pipe is inserted into the bottom of the second through hole, the bottom of the suction pipe extends toward the bottom of the bottle body, and a one-way valve is mounted inside the second through hole and above the top of the suction pipe;

the piston capable of moving up and down is mounted at the top of the oil spray cylinder, an oil storage chamber is defined in the oil spray cylinder between the bottom of the piston and the pressure valve, the lever is mounted on the upper cover to be resisted against the top of the piston.

7. The oil bottle of claim 6, wherein the oil spray cylinder and the upper cover are integrated into one piece;

the piston is a diameter-reduced upper portion, the bottom of the piston is resisted against the inner wall of the oil spray cylinder to be movably sealed;

an inner cover is disposed at the top of the oil spray cylinder, the piston has a step at the peripheral surface of the piston for the inner cover to resist against and be limited, and the top of the piston extends out of the upper cover to be resisted against the lever through a connecting cover.

8. The oil bottle of claim 7, wherein the housing has an opening for mounting the lever at the rear side of the top of the housing, a covering plate is disposed at the opening below the lever to cover the internal components;

the upper cover has two connecting lugs at the middle portion of the upper cover, a shaft pin is correspondingly mounted at the front end of the lever, and the lever is rotatably connected to the connecting lugs through the shaft pin;

the connecting cover is connect to the top of the piston, the top of the connecting cover has an arc-shaped protrusion, the bottom of the lever has a corresponding arc-shaped concave surface, and the piston is resisted against the lever through the arc-shaped protrusion resisting against the arc-shaped concave surface;

a reset spring is sleeved outside the piston, so as to make the piston keep moving upward.

9. The oil bottle of claim 1, wherein the housing surrounds the upper cover and is connected to the upper cover;

a handle is connect to the rear end of the housing, a top cover covers on the top of the housing, and the top cover has a round hole for receiving the button.

10. The oil bottle of claim 2, wherein an oil pouring nozzle is disposed inside the oil pouring port of the housing and the oil outlet of the upper cover to communicate the oil pouring port and the oil outlet.

* * * * *